US009770832B2

United States Patent
Cossette et al.

(10) Patent No.: US 9,770,832 B2
(45) Date of Patent: Sep. 26, 2017

(54) ADJUSTABLE LENGTH ROBOTIC CABLE FITTING

(71) Applicants: Romeo N. Cossette, Windsor (CA); Jeffrey G. Wells, Belle River (CA)

(72) Inventors: Romeo N. Cossette, Windsor (CA); Jeffrey G. Wells, Belle River (CA)

(73) Assignee: Illinois Tool Works Inc., Glenview, IL (US)

( * ) Notice: Subject to any disclaimer, the term of this patent is extended or adjusted under 35 U.S.C. 154(b) by 131 days.

(21) Appl. No.: 14/670,824

(22) Filed: Mar. 27, 2015

(65) Prior Publication Data
US 2016/0279807 A1 Sep. 29, 2016

(51) Int. Cl.
*B23K 9/10* (2006.01)
*B25J 19/00* (2006.01)
*B23K 9/00* (2006.01)
*B23K 9/133* (2006.01)
*B23K 9/32* (2006.01)

(52) U.S. Cl.
CPC ............. *B25J 19/0029* (2013.01); *B23K 9/00* (2013.01); *B23K 9/133* (2013.01); *B23K 9/323* (2013.01); *Y10S 901/27* (2013.01)

(58) Field of Classification Search
CPC ......... B25J 19/0029; B25J 18/00; B23K 9/00; B23K 9/133; B23K 9/323; Y10S 901/27; Y10T 74/20311; H01R 9/0521
USPC ............ 219/130.1; 403/350, 109.1; 411/427; 901/42; 174/380, 69; 294/210, 134; 248/70; 16/109; 285/382.7
See application file for complete search history.

(56) References Cited

U.S. PATENT DOCUMENTS

| 5,639,098 A | * | 6/1997 | MacDonald | ......... B63H 23/321 277/391 |
| 5,693,944 A | * | 12/1997 | Rich | ...................... G01N 21/05 250/343 |
| 6,172,334 B1 | | 1/2001 | Harris et al. | |

(Continued)

FOREIGN PATENT DOCUMENTS

JP S5847379 3/1983
JP 2010-260059 11/2010

OTHER PUBLICATIONS

ISR in PCT/US2016/020030 dated Jun. 29, 2016.
Written Opinion in PCT/US2016/020030 dated Jun. 29, 2016.
English language abstract of JP 2010-260059.

*Primary Examiner* — Tu B Hoang
*Assistant Examiner* — Joseph Baillargeon
(74) *Attorney, Agent, or Firm* — Fildes & Outland, P.C.

(57) ABSTRACT

An adjustable cable fitting for a thru-arm cable of a robotic welding torch includes a female member formed of an elongated tubular body having a forward end, a rear end, and a through hole extending axially from the forward end to the rear end. The forward end includes a nose portion for connection to a welding cable. A male member is cooperable with the female member in a telescoping manner. The male member includes a shaft received in the through hole of the female member, a receiver connected to the shaft for receiving a power pin, and a through hole extending axially through the shaft and receiver. A nut is disposed on the shaft for locking a position of the shaft relative to the female member. Adjustment of a disposition of the male member relative to the female member varies an effective length of the power cable.

11 Claims, 17 Drawing Sheets

(56) References Cited

U.S. PATENT DOCUMENTS

| | | | |
|---|---|---|---|
| 7,790,984 B2* | 9/2010 | Choi | B25J 19/0025 |
| | | | 174/135 |
| 8,496,421 B1* | 7/2013 | Burton | F16B 39/124 |
| | | | 411/226 |
| 8,544,359 B2* | 10/2013 | Liu | B25J 19/0025 |
| | | | 74/490.01 |
| 8,851,784 B2* | 10/2014 | Donohue | B25G 1/04 |
| | | | 403/109.1 |
| 2002/0113049 A1 | 8/2002 | Paxton et al. | |
| 2011/0227337 A1* | 9/2011 | Kattler | F16L 19/103 |
| | | | 285/351 |
| 2011/0233179 A1 | 9/2011 | Wells et al. | |
| 2012/0141199 A1* | 6/2012 | Anderson, III | F16D 1/05 |
| | | | 403/370 |
| 2014/0102240 A1* | 4/2014 | Inada | B25J 17/0283 |
| | | | 74/490.02 |
| 2014/0137685 A1* | 5/2014 | Iwayama | B25J 18/00 |
| | | | 74/490.02 |

* cited by examiner

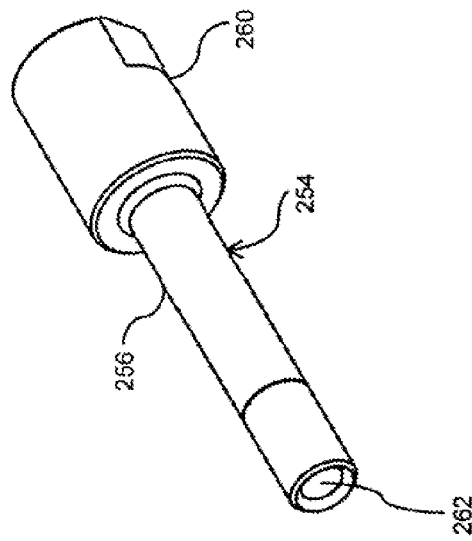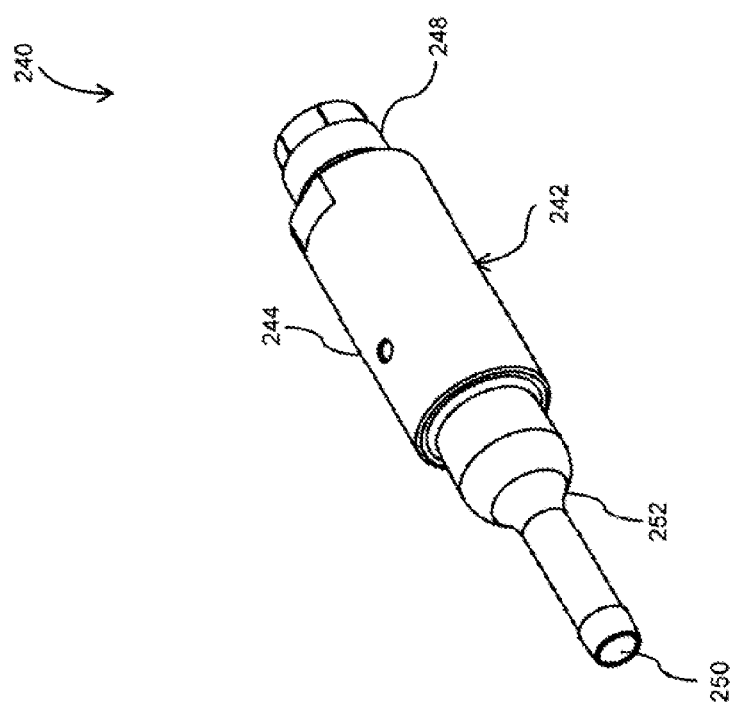
Fig. 15

ADJUSTABLE LENGTH ROBOTIC CABLE FITTING

TECHNICAL FIELD

This disclosure relates to thru-arm robotic welding torch systems, and more particularly to a welding cable fitting for a thru-arm robotic welding torch system.

BACKGROUND OF THE INVENTION

A thru-arm robotic welding torch system generally includes a multi-axis robotic arm and a welding torch mounted to a distal end of the robotic arm. A power cable connects the welding torch to a source of welding power, consumable electrode wire, shielding gas, and optionally cooling liquid. The power cable may be a unicable design in which welding power, electrode wire, shielding gas, and optionally cooling liquid are all transferred within a single cable assembly from the source to the welding torch. The power cable extends from the source and internally through the robotic arm to the welding torch.

Typically in thru-arm robotic welding torch systems, the power cable has a specified fixed length. It is known in the art relating to thru-arm welding systems that the length of the thru-arm power cable should be within 0.25 inches of the specified length to ensure proper operation and longevity of the cable and the welding torch mounted on the robotic arm. The specified length is the cable length that is specified in the part description of a robotic arm. However, thru-arm cables made for thru-arm welding robots may vary by as much as 0.75 inches from the specified length, which may cause fitment issues and may ultimately affect the lifespan of the cable.

SUMMARY OF THE INVENTION

Disclosed is an adjustable fitting that provides adjustment of a thru-arm cable up to one inch in either direction (lengthening or shortening) from the cable's stock length. The disclosed adjustable fitting easily adjusts the length of the cable so that it is at or within 0.25 inches of the specified cable length for a particular robotic arm welding torch system.

More particularly, an adjustable cable fitting for a thru-arm cable of a robotic welding torch includes a female member formed of an elongated tubular body having a forward end, a rear end, and a through hole extending axially from the forward end to the rear end. The forward end includes a nose portion for connection to a welding cable. A male member is cooperable with the female member in a telescoping manner. The male member includes a shaft received in the through hole of the female member, a receiver connected to the shaft for receiving a power pin, and a through hole extending axially through the shaft and receiver. A nut is disposed on the shaft for locking a position of the shaft relative to the female member. Adjustment of a disposition of the male member relative to the female member varies an effective length of the power cable.

In one embodiment, the shaft may have a generally smooth outer surface. A compressible sleeve may be disposed on the shaft, and the nut may be fitable around the compressible sleeve to compress the compressible sleeve onto the shaft. The compressible sleeve may be a brass sleeve, and the nut may be a brass nut. The nut may have an inner surface including a chamfer, and the rear end of the female member may include a chamfer. The chamfers on the nut and the female member may compress the compressible sleeve when the nut is tightened. A scribe line may circumscribe the shaft for indicating a maximum allowable extension of the shaft out of the through hole of the female member.

In another embodiment, the shaft may have a threaded outer surface, and the through hole of the female member may have a threaded surface that is cooperable with the threaded outer surface of the shaft. The nut may be a jam nut disposed on said shaft for locking the position of the shaft relative to the female member.

In another embodiment, the nut may have a tapered inner surface, the rear end of the female member may include a tapered surface having longitudinal slits, and the tapered inner surface of the nut may be cooperable with the tapered surface of the female member to compress the rear end of the female member onto the shaft.

A sleeve may cover at least a portion of the male and female parts.

A thru-arm robotic welding torch system includes a multi-axis robotic arm having a distal, tool mounting end. A welding torch is mounted on the distal, tool mounting end of the multi-axis robotic arm. A power cable is connected on one end to the welding torch and extends through the multi-axis robotic arm. The power cable is connected on an opposite end to the adjustable cable fitting.

The power cable may be crimped on the nose portion of the female member. A power pin may be received in the receiver of the male member, and a wire feeder may be connected to the power pin. Adjustment of a disposition of the male member relative to the female member varies an effective length of the power cable between the power pin and the welding torch.

These and other features and advantages of the assembly will be more fully understood from the following detailed description of the invention taken together with the accompanying drawings.

BRIEF DESCRIPTION OF THE DRAWINGS

In the drawings:

FIG. 15 is an exploded perspective view of another embodiment of an adjustable length robotic cable fitting;

DETAILED DESCRIPTION OF THE INVENTION

Figure 1:
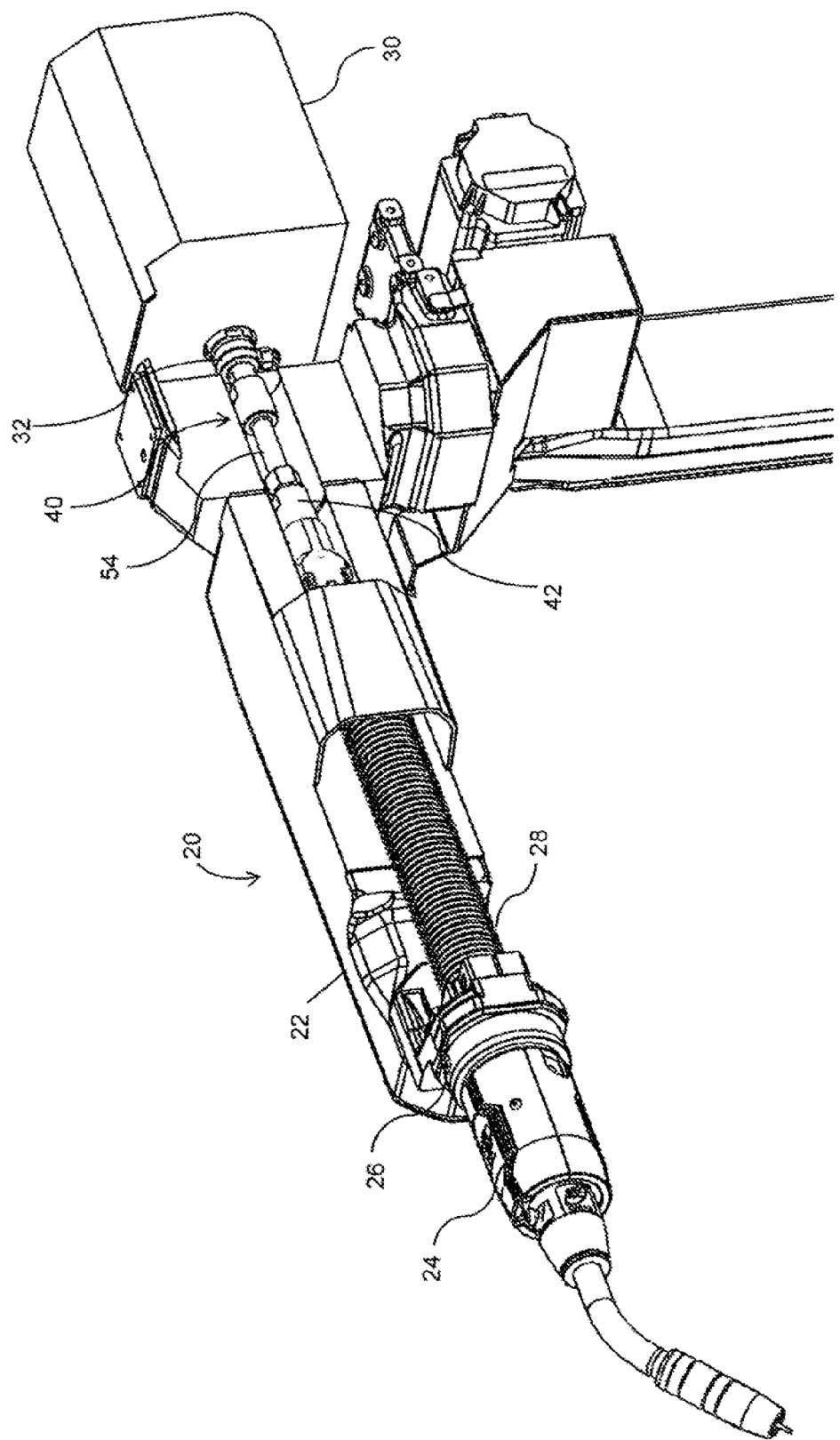
FIG. 1 is a perspective view of a robotic MIG welding torch system including an adjustable length robotic cable fitting.
Figure 2:
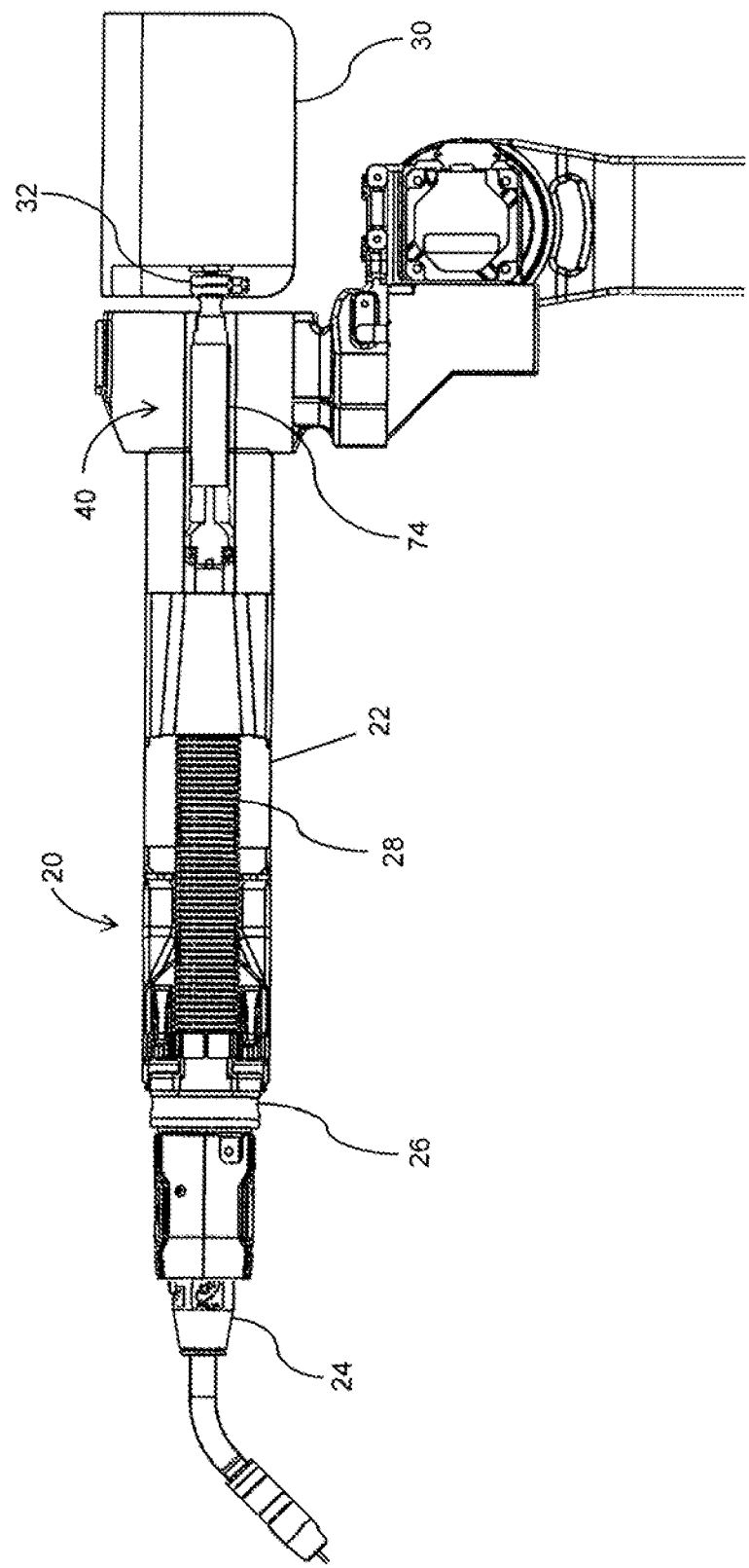
FIG. 2 is a side view of the robotic MIG welding torch system including the adjustable length robotic cable fitting.
Figure 3:
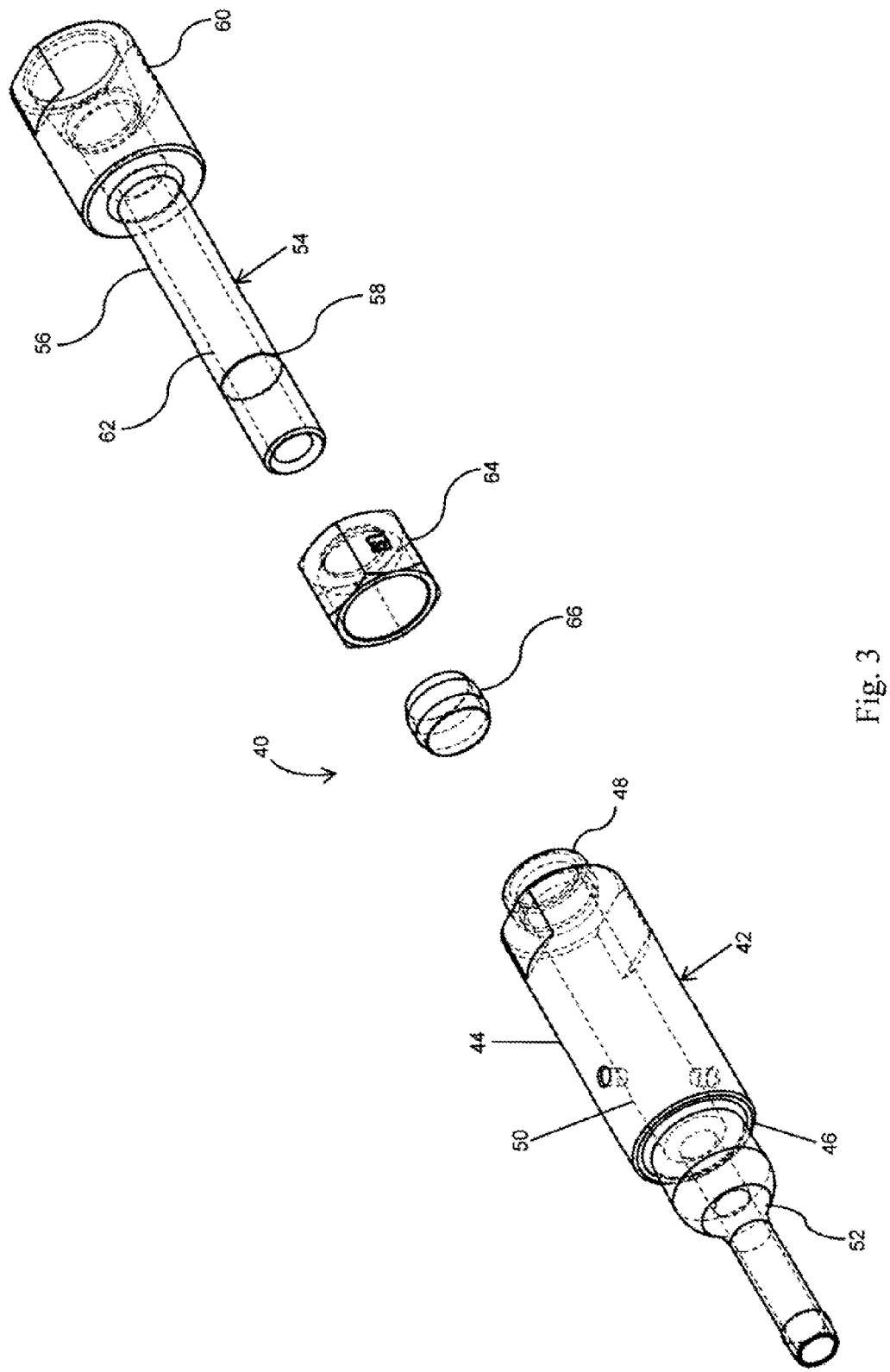
FIG. 3 is an exploded view of an embodiment of an adjustable length robotic cable fitting.

Referring to FIGS. 1 and 2 of the drawings in detail, a robotic welding torch system 20 disclosed includes a multi-axis controllable robotic arm 22. A welding torch 24 is mounted on a distal end 26 of the robotic arm 22 via an end effecter or other mounting structure. A welding power cable 28 is connected on one end to the welding torch 24. The power cable 28 extends through the robotic arm 22. The opposite end of the power cable 28 is connected to a wire feeder 30 via a power pin 32. The wire feeder 30 may serve as a supplier of both consumable electrode welding wire and welding current. The power cable 28 may be a unicable or similar multipurpose cable which transmits at least welding current and consumable electrode wire from the wire feeder 30 to the welding torch 24. An adjustable cable fitting 40 allows for adjustment of the effective length of the power cable 28 between the power pin 32 and the welding torch 24. Consumable electrode wire, welding current and/or shielding gas may be transferred from the wire feeder 30 and power pin 32 through the fitting 40 to the power cable 28 for supply to the welding torch 24 at the end of the robotic arm 22.

Figure 8:
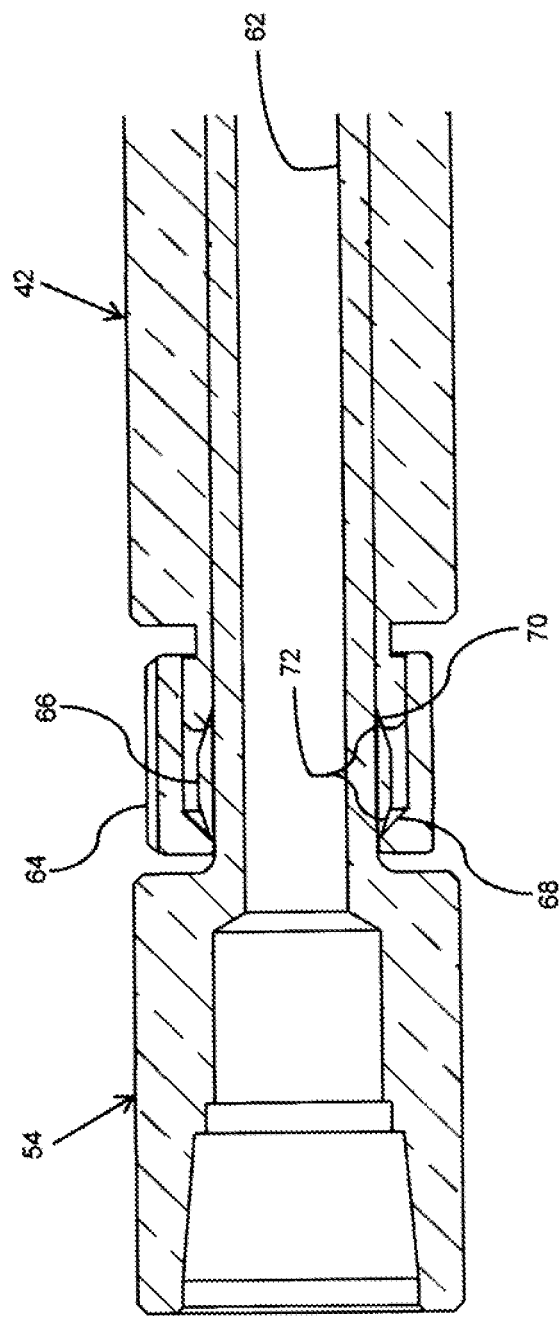
FIG. 8 is a partial sectional view of the adjustable length robotic cable fitting of FIG. 3.
Figure 9:
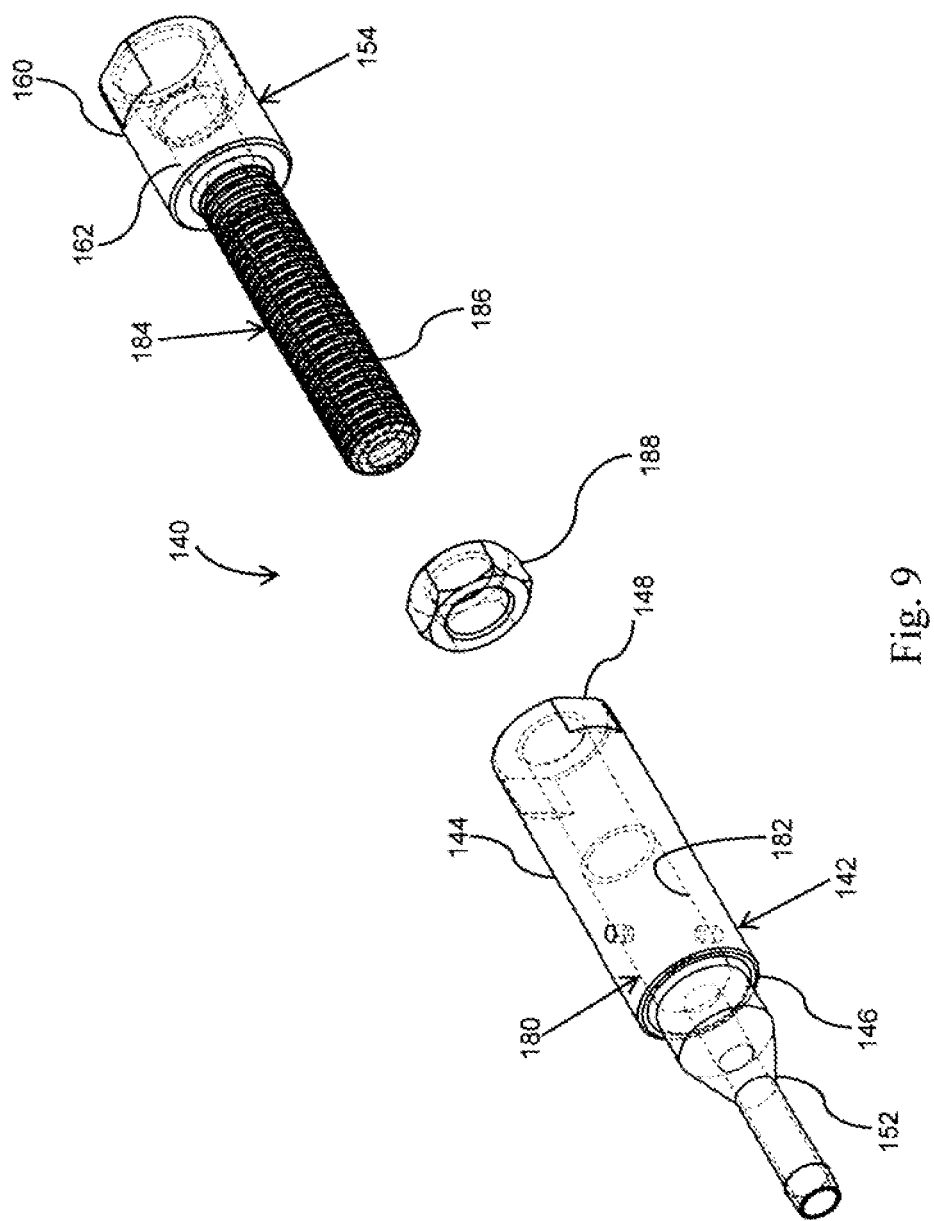
FIG. 9 is an exploded view of another embodiment of an adjustable length robotic cable fitting.
Figure 10:
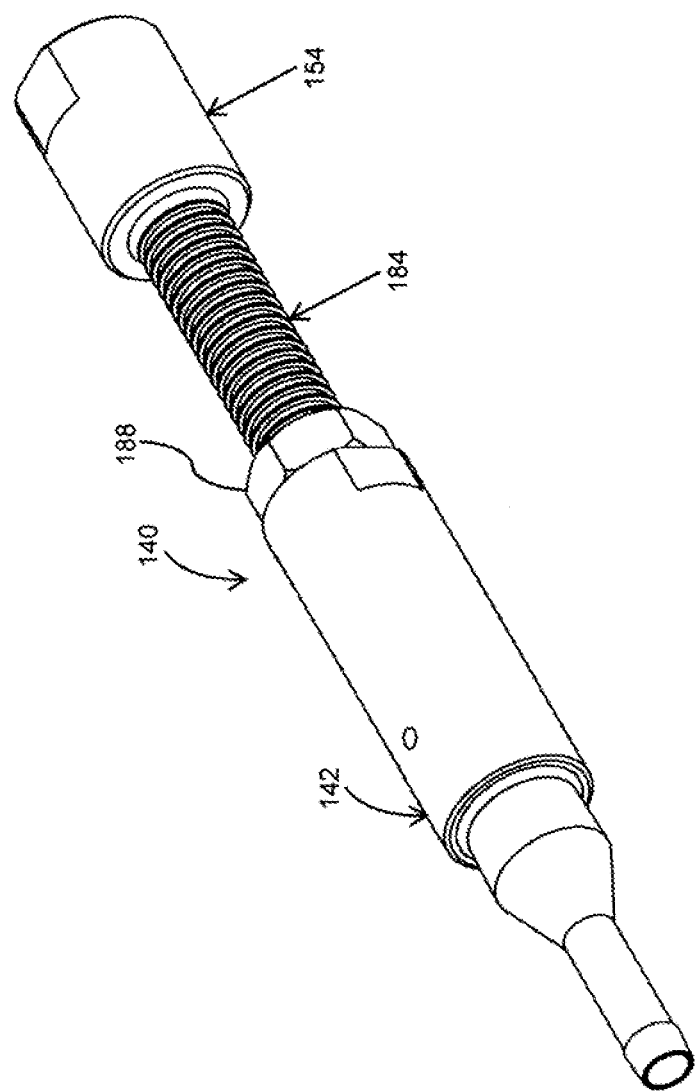
FIG. 10 is a perspective view of the adjustable length robotic cable fitting of FIG. 9 in a fully extended disposition.

Turning to FIGS. 1 and 3-8, in a first embodiment the adjustable cable fitting 40 includes a female member 42 formed of an elongated tubular body 44 having a forward end 46, a rear end 48, and a through hole 50 extending axially from the forward end to the rear end. The forward end 46 of the female member 42 includes a nose portion 52 for connection of the fitting 40 to the welding power cable 28 (shown in FIG. 1), e.g. by crimping the power cable onto the nose portion. The fitting 40 also includes a male member 54 that is cooperable with the female member 42 in a telescoping manner. The male member 54 includes a shaft 56 received in the through hole 50 of the female member 42. A scribe line 58 circumscribes the shaft 56 and indicates a maximum allowable extension of the shaft out of the through hole 50 of the female member 42. In the first embodiment, the shaft 56 has a generally smooth outer surface. The male member 54 also includes a receiver 60 connected to the shaft 56 for receiving the power pin 32 therein, and a through hole 62 extends axially through the shaft and receiver of the male member. A nut 64 is connected to the rear end 48 of the female member 42 and is disposed on the shaft 56 of the male member 54 for locking a position of the shaft relative to the female member. Particularly, a compressible sleeve 66 is disposed on the shaft 56, and the nut 64 is fitable around the compressible sleeve to compress the compressible sleeve onto the shaft. The compressible sleeve 66 may be made of brass or a similarly suitable material, and the nut 64 also may be made of brass or a similarly suitable material. As shown in FIG. 8, the nut 64 has an inner surface including a chamfer 68, and the rear end 48 of the female member 42 includes a chamfer 70. The chamfers 68, 70 on the nut and the female member compress the compressible sleeve 66 when the nut is tightened.

Figure 4:
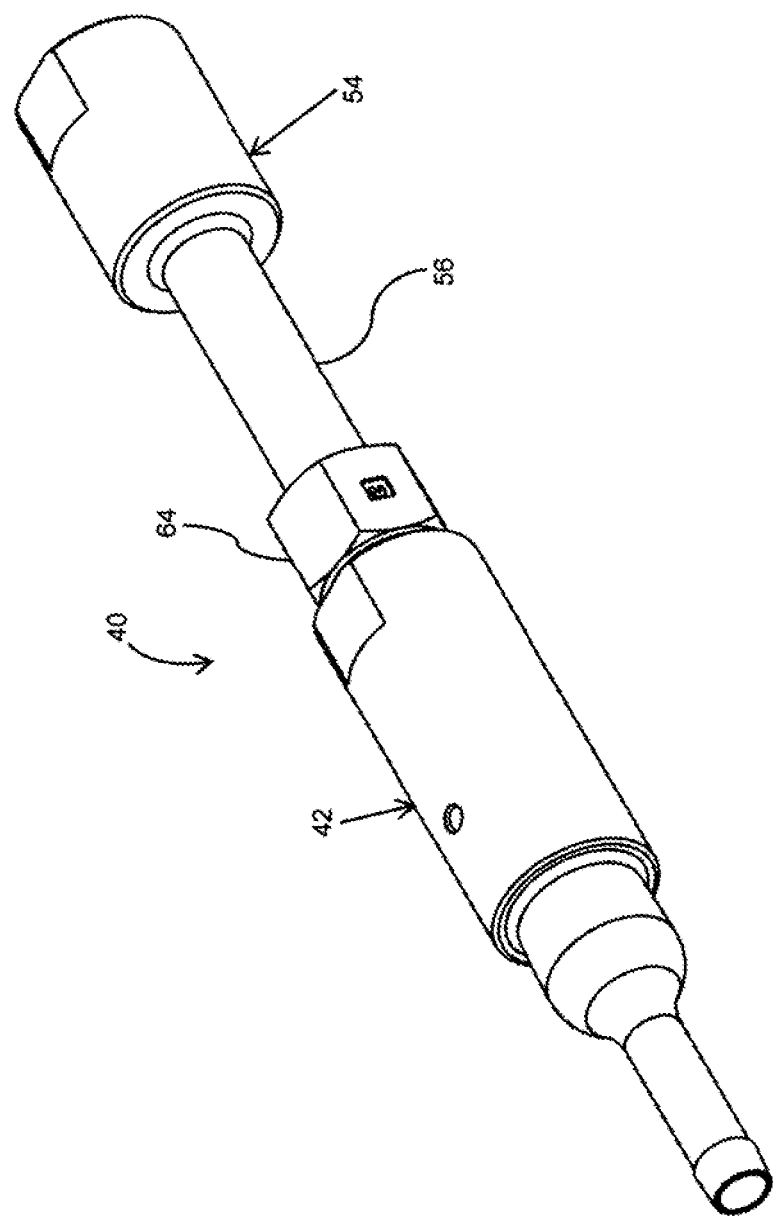
FIG. 4 is a perspective view of the adjustable length robotic cable fitting of FIG. 3 in a fully extended disposition.
Figure 5:
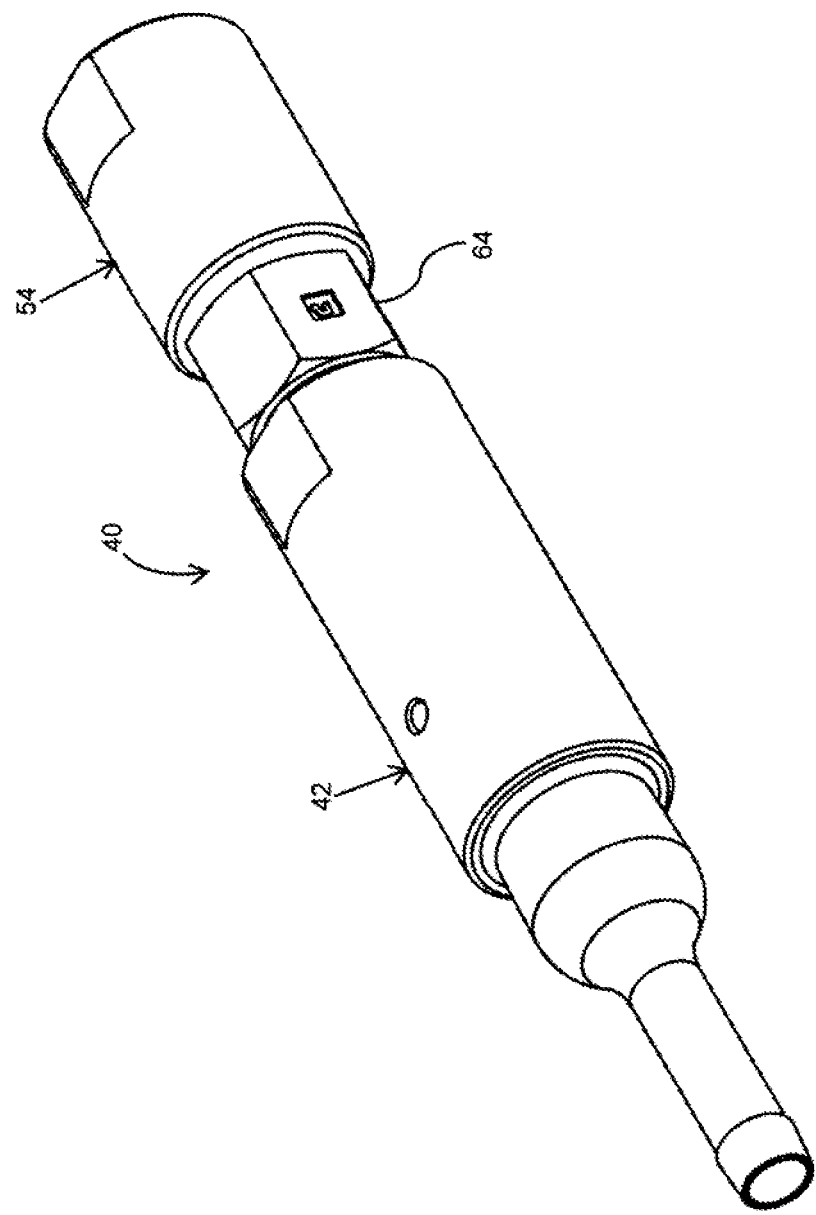
FIG. 5 is a perspective view of the adjustable length robotic cable fitting of FIG. 3 in a fully collapsed disposition.
Figure 6:
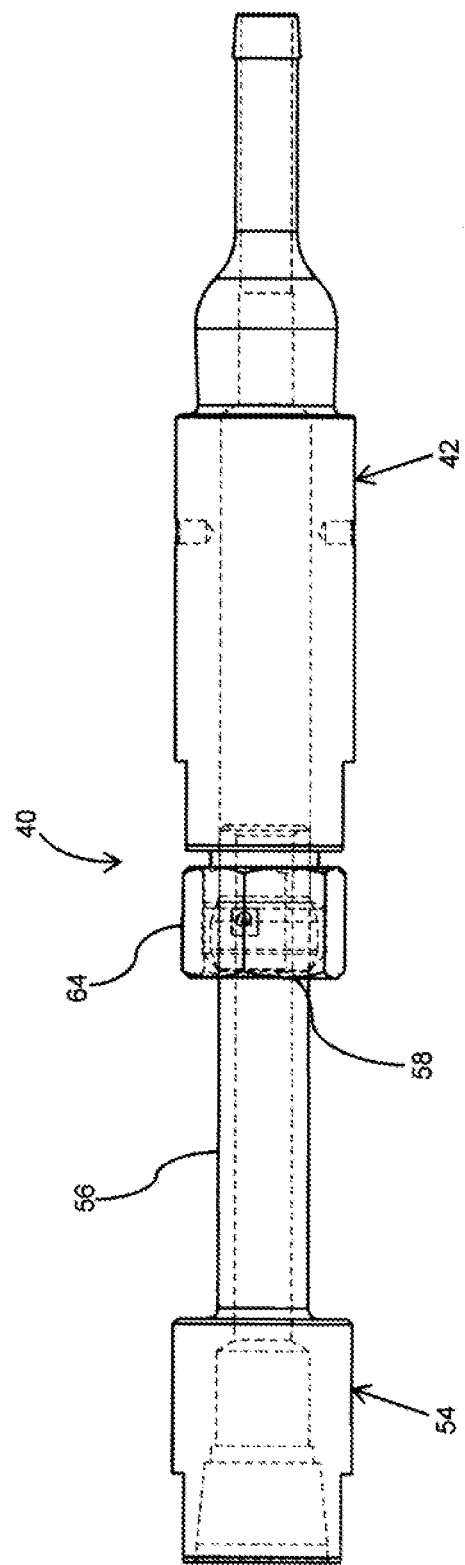
FIG. 6 is a side view of the adjustable length robotic cable fitting of FIG. 3 in a fully extended disposition.
Figure 7:
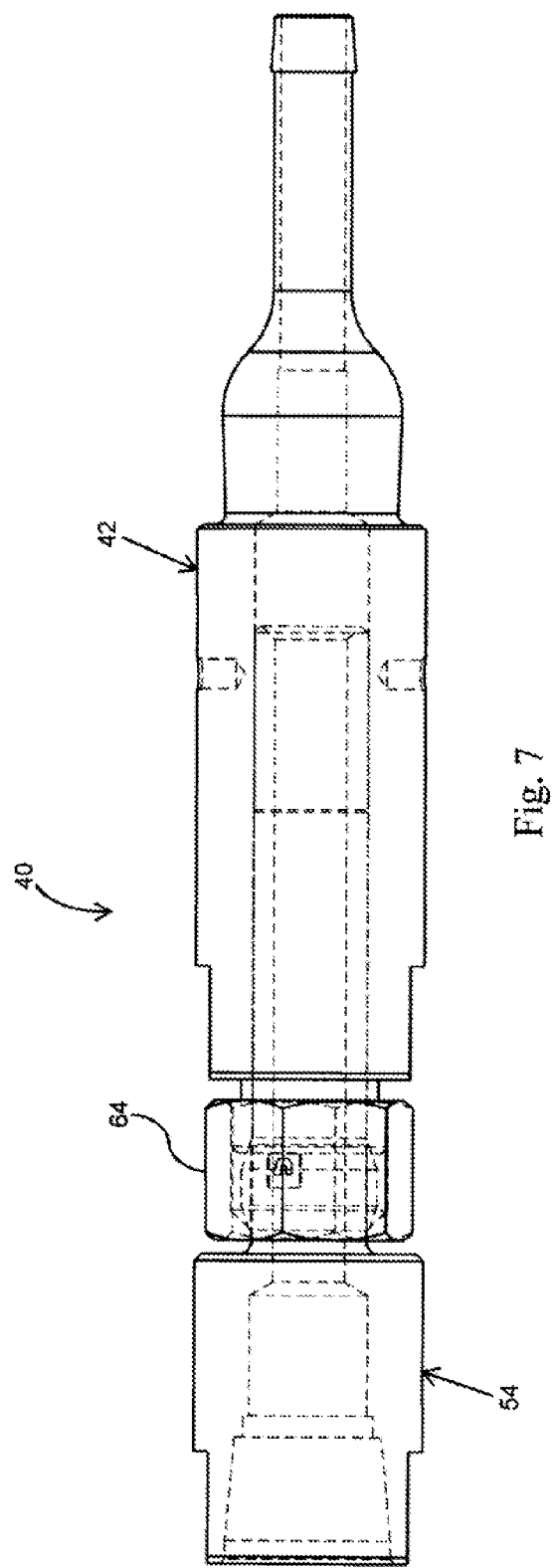
FIG. 7 is a side view of the adjustable length robotic cable fitting of FIG. 3 in a fully collapsed disposition.

Adjustment of a disposition of the male member 54 relative to the female member 42 varies an effective length of the power cable 28 between the power pin 32 and the welding torch 24. More specifically, the fitting 40 is shown in a fully collapsed disposition in FIGS. 5 and 7. To extend the length of the fitting 40, the nut 64 is rotated to loosen the compressible sleeve 66 so that the shaft 56 of the male member 54 is slideable in the through hole 50 of the female member 42. The shaft 56 is pulled out of the through hole until a desired length is reached. When the scribe line 58 on the shaft reaches the outer edge of the nut, the shaft is fully extended as shown in FIGS. 4 and 6. To tighten the shaft at the desired length of extension, the nut 64 is rotated in the opposite direction, causing the chamfers 68, 70 on the inside of the nut and the end of the female member to contact tapers 72 on the compressible sleeve 66 to compress the compressible sleeve down onto the shaft, thereby holding the shaft in place relative to the female member. Alternatively, the compressible sleeve may include only a single taper. Once the nut 64 is tightened, there is sufficient force between the compressible sleeve 66 and the shaft 56 to prevent escape of shielding gas from inside the fitting and to provide a secure contact area for welding current passage during use of the welding torch.

At least a portion of the female and male members 42, 54 (e.g., the telescoping portion of the fitting 40) may be covered with a protective sleeve 74 after adjustment of the relative disposition of the male and female members and prior to connection of the fitting to the power cable 28 as shown in FIG. 2. The protective sleeve is not present in FIG. 1. The protective sleeve 74 may be made of plastic or other similarly suitable material.

Turning to FIGS. 9-14, in a second embodiment the adjustable cable fitting 140 includes a threaded connection between the female and male members 142, 154. The female member 142 of the fitting 140 is formed of an elongated tubular body 144 having a forward end 146, a rear end 148, and a through hole 180 extending axially from the forward end to the rear end. The through hole 180 of the female member has a threaded surface 182. The forward end 146 of the female member 142 includes a nose portion 152 for connection of the fitting 140 to a welding power cable. The male member 154 of the fitting 140 is cooperable with the female member 142 in a telescoping manner. The male member 154 includes a shaft 184 received in the through hole 180 of the female member 142. The shaft 184 has a threaded outer surface 186 which is cooperable with the treaded surface 182 of the through hole 180. The male member 154 also includes a receiver 160 connected to the shaft 184 for receiving a power pin therein, and a through hole 162 extends axially through the shaft and receiver of the male member. A nut 188 such as a jam nut or similar is disposed on the shaft 184 of the male member 154 for locking a position of the shaft relative to the female member 142. Particularly, the nut 188 has a threaded inner surface and is rotatable on the threaded shaft 184 such that the nut can be tightened against the rear end 148 of the female member 142 to lock the position of the male member 154 relative to the female member, and the nut can be loosened to allow the male member to be extended or retracted.

Figure 11:
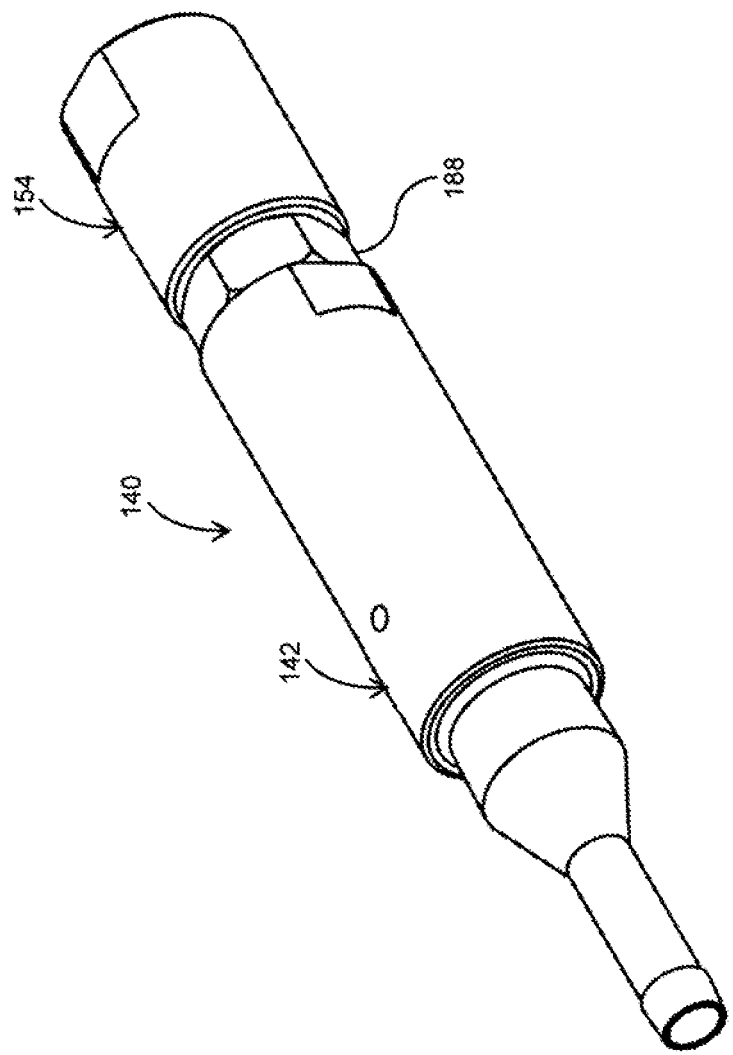
FIG. 11 is a perspective view of the adjustable length robotic cable fitting of FIG. 9 in a fully collapsed disposition.
Figure 12:
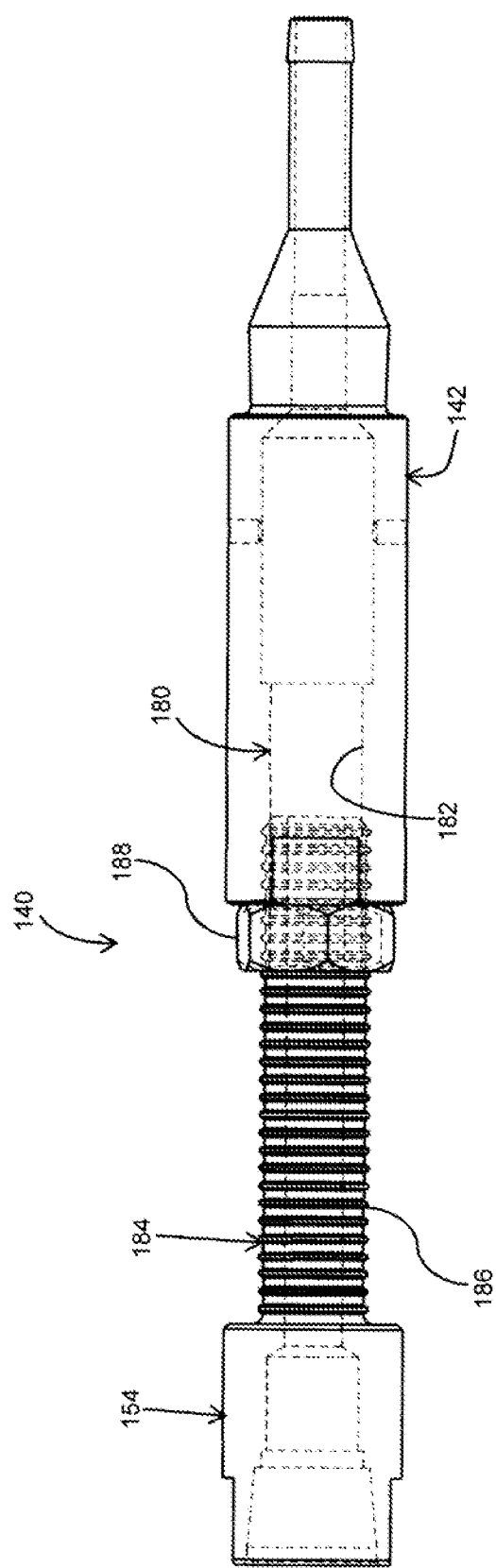
FIG. 12 is a side view of the adjustable length robotic cable fitting of FIG. 9 in a fully extended disposition.
Figure 13:
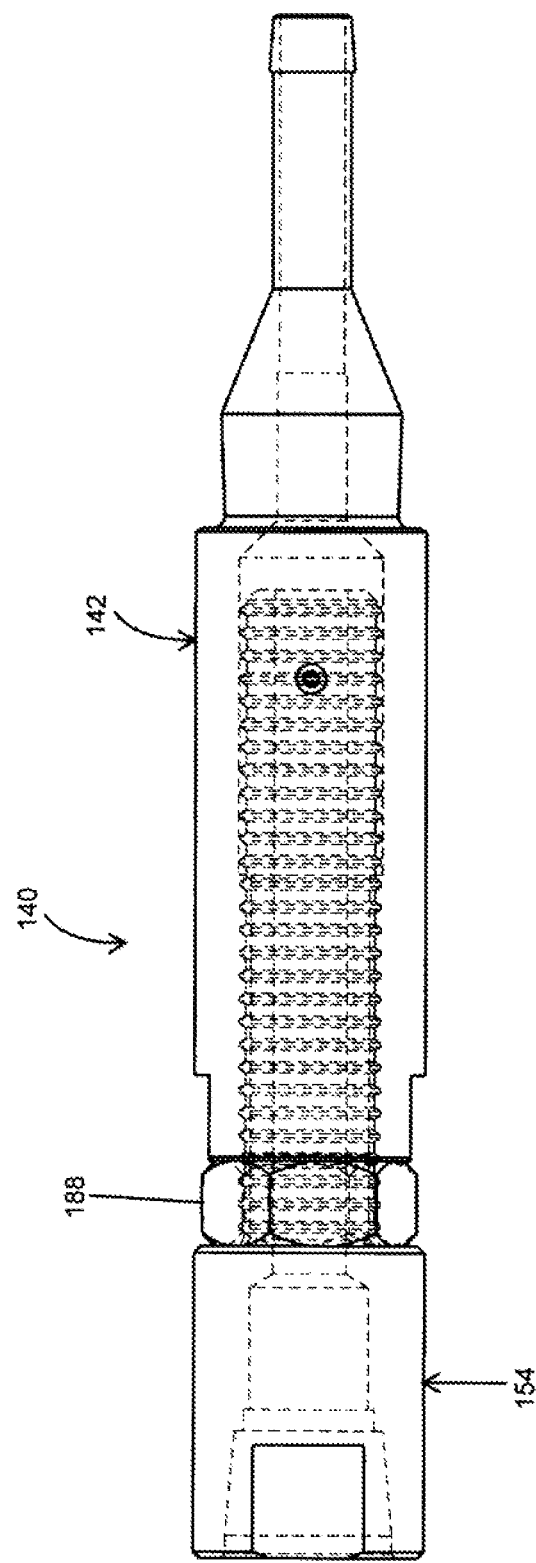
FIG. 13 is a side view of the adjustable length robotic cable fitting of FIG. 9 in a fully collapsed disposition.
Figure 14:
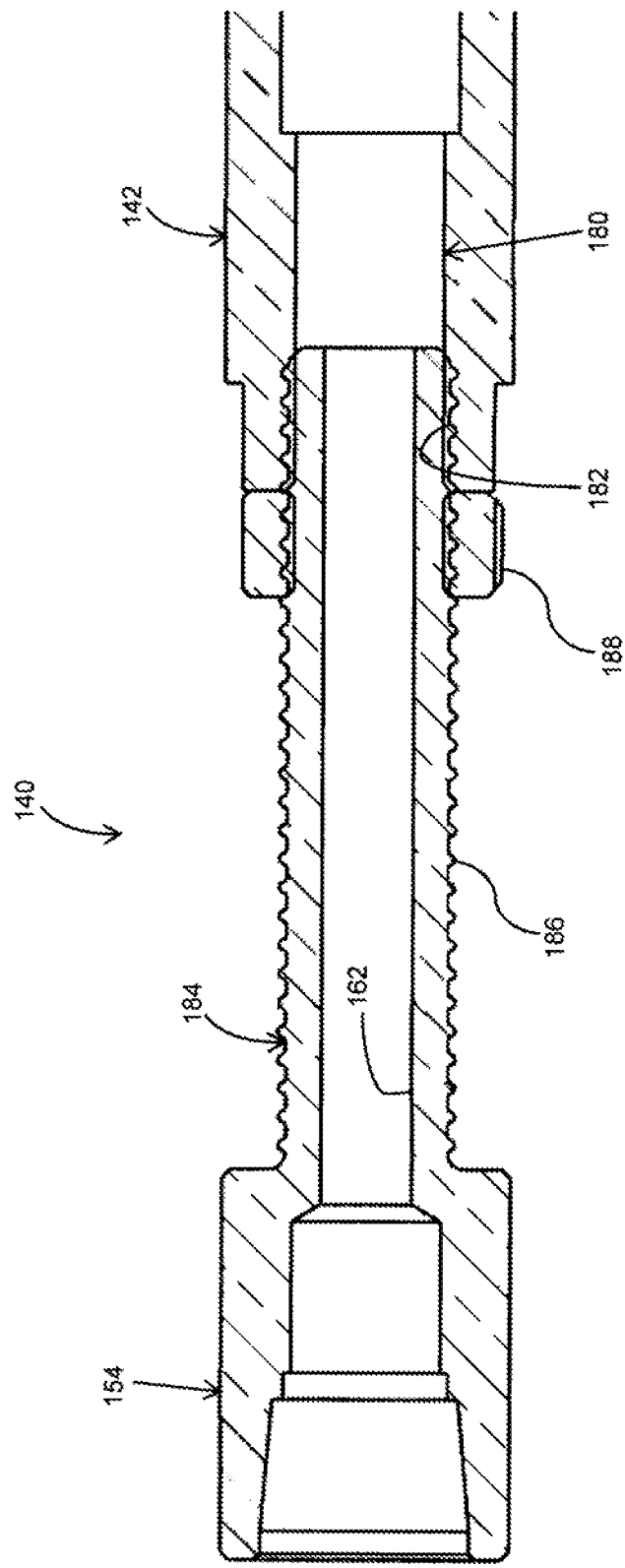
FIG. 14 is a partial sectional view of the adjustable length robotic cable fitting of FIG. 9.

More specifically, the fitting 140 is shown in a fully collapsed disposition in FIGS. 11 and 13. To extend the length of the fitting 140, the nut 188 is rotated to loosen the nut by moving it away from contact with the rear end 148 of the female member 142. Loosening of the nut 188 allows the shaft 184 of the male member 154 to be turned in the through hole 180 of the female member 142. The shaft 184 is rotated, moving the male member 154 out of the through hole 180 until a desired length is reached. The shaft 184 is shown as being fully extended as in FIGS. 10 and 12. To tighten the shaft 184 at the desired length of extension, the nut 188 is rotated in the opposite direction until the nut is tightly in place against the rear end 148 of the female member 142, thereby holding the shaft in place relative to the female member. Once the nut 188 is tightened, there is sufficient force placed on the threads to prevent escape of shielding gas from inside the fitting and to provide a secure contact area for welding current passage during use of the welding torch.

Figure 16:
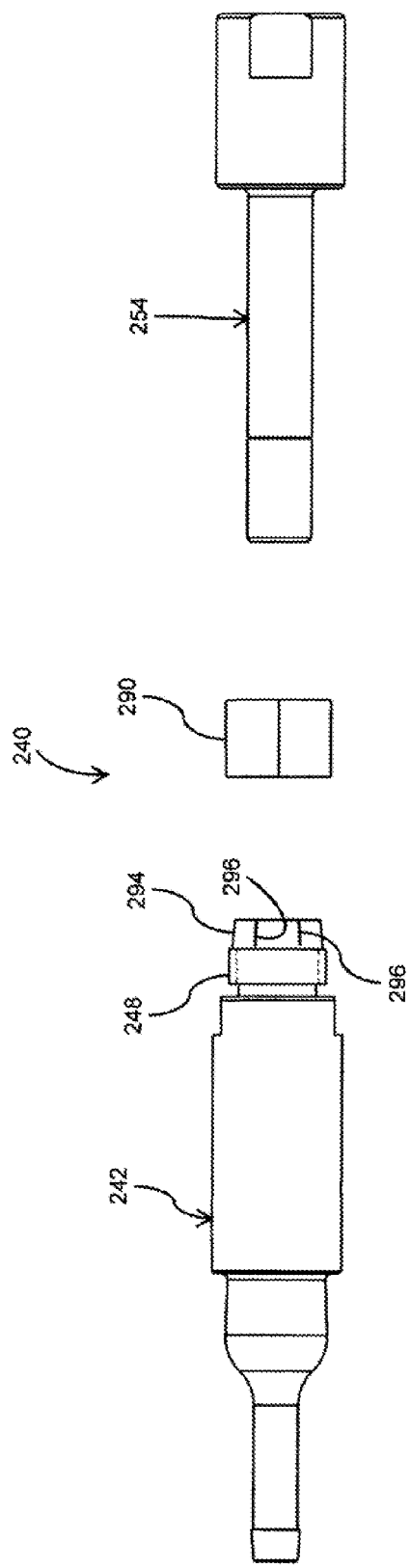
FIG. 16 is an exploded side view of the adjustable length robotic cable fitting of FIG. 15.
Figure 17:
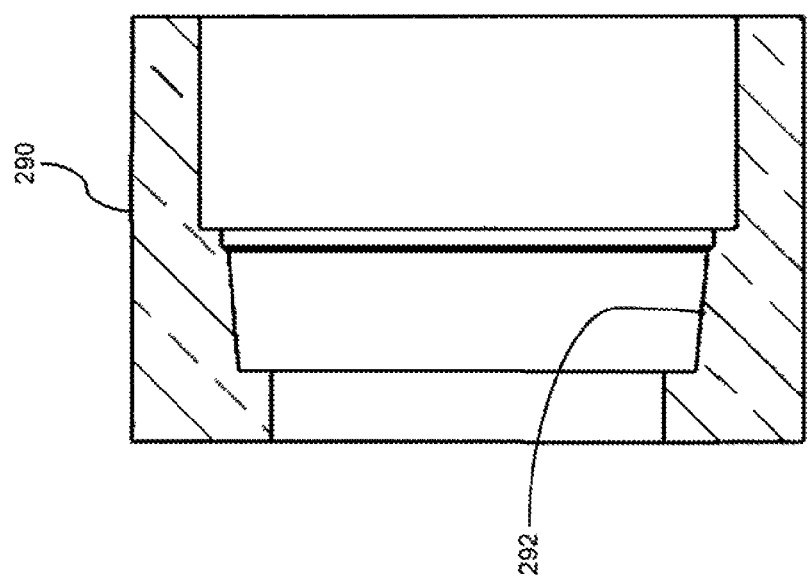
FIG. 17 is a sectional view of a nut of the adjustable length robotic cable fitting of FIG. 15.

Turning to FIGS. 15-17, in a third embodiment the adjustable cable fitting 240 includes a female member 242 formed of an elongated tubular body 244 having a forward end 246, a rear end 248, and a through hole 250 extending axially from the forward end to the rear end. The forward end 246 of the female member 242 includes a nose portion 252 for connection of the fitting 240 to a welding power cable. The through hole 250 of the female member has a generally smooth surface for receiving a male member 254. The male member 254 of the fitting 240 is cooperable with the female member 242 in a telescoping manner. The male member 254 includes a shaft 256 received in the through hole 250 of the female member 242. The shaft 256 has a smooth outer surface which is cooperable with the smooth inner surface of the through hole 250. The male member 254 also includes a receiver 260 connected to the shaft 256 for receiving a power pin therein, and a through hole 262 extends axially through the shaft and receiver of the male member. A nut 290 is disposed on the shaft 256 of the male member 254 for locking a position of the shaft relative to the female member 242. Particularly, the nut 290 may be made of brass or other similar material, and the nut has a tapered inner surface 292. The rear end 248 of the female member 242 includes a tapered surface 294 having longitudinal slits 296. The tapered surface 294 of the female member rear end 248 is cooperable with the tapered inner surface 292 of the nut 290 and functions as a collet when mated with the tapered surface of the nut to lock the position of the male member 254 relative to the female member. The nut 290 can be displaced from the rear end 248 of the female member 242 to allow the male member to be extended or retracted.

More specifically, to extend the length of the fitting 240, the nut 290 is loosened by moving it away from contact with the rear end 248 of the female member 242. Loosening of the nut 290 allows the shaft 256 of the male member 254 to slide in the through hole 250 of the female member 242. From a fully collapsed disposition, the shaft 256 of the male member 254 is moved out of the through hole 250 until a desired length is reached. To tighten the shaft 256 at the desired length of extension, the nut 290 is pressed onto the tapered surface 294 of the rear end 248 of the female member 242 until the nut is tightly in place on the rear end of the female member, thereby compressing the female member rear end onto the shaft and holding the shaft in place relative to the female member. Once the nut 290 is tightened, there is sufficient force placed on the shaft 256 to prevent escape of shielding gas from inside the fitting and to provide a secure contact area for welding current passage during use of the welding torch.

In another alternative embodiment, the male and female members may be reversed such that the male member is the end of the fitting on which the power cable is crimped and the female member includes the receiver for connection to the power pin.

Although the assembly has been described by reference to specific embodiments, it should be understood that numerous changes may be made within the spirit and scope of the inventive concepts described. Accordingly, it is intended that the assembly not be limited to the described embodiments, but that it have the full scope defined by the language of the following claims.

What is claimed is:

1. An adjustable cable fitting and a thru-arm welding power cable of a robotic welding torch the fitting comprising:
    a female member formed of an elongated tubular body having a forward end, a rear end, and a through hole extending axially from the forward end to the rear end;
    said forward end of said female member including a nose portion for connection to an end of said welding power cable, wherein said power cable connects over said nose portion and extends outwardly from said nose portion in only one direction, said female member being, in part, said end of said power cable in the opposite direction of said one direction;
    a male member cooperable with said female member in a telescoping manner and completing with said female member the end of said power cable in said opposite direction of said one direction;
    said male member including a shaft received in said through hole of said female member opposite said nose portion of said female member, a receiver connected to said shaft for receiving a power pin that is separate from said power cable, and a through hole extending axially through said shaft and said receiver, said receiver having a larger outer diameter than said shaft, and said receiver and said female member being positioned at opposite ends of said shaft; and
    a nut disposed on said shaft of said male member for locking a position of said shaft relative to said female member;
    wherein adjustment of a disposition of said male member relative to said female member varies a relative length of said power cable.

2. The adjustable cable fitting of claim 1, wherein said shaft has a smooth outer surface.

3. The adjustable cable fitting of claim 2, including a compressible sleeve disposed on said shaft, wherein said nut is fitable around said compressible sleeve to compress said compressible sleeve onto said shaft.

4. The adjustable cable fitting of claim 3, wherein said compressible sleeve is a brass sleeve.

5. The adjustable cable fitting of claim 2, wherein said nut is a brass nut.

6. The adjustable cable fitting of claim 2, wherein said nut has an inner surface including a chamfer, and said rear end of said female member includes a chamfer, said chamfers on said nut and said female member compress said compressible sleeve when said nut is tightened.

7. The adjustable cable fitting of claim 2, including a scribe line circumscribing said shaft for indicating a maximum allowable extension of said shaft out of said through hole of said female member.

8. The adjustable cable fitting of claim 1, including a sleeve that covers at least a portion of said male and female parts.

9. A thru-arm robotic welding torch system comprising:
a multi-axis robotic arm having a distal, tool mounting end;
a welding torch mounted on said distal, tool mounting end of said multi-axis robotic arm; and
said welding power cable of claim 1 connected on one end to said welding torch and extending through said multi-axis robotic arm, said power cable being connected on an opposite end to said adjustable cable fitting of claim 1.

10. The thru-arm robotic welding torch system of claim 9, wherein said power cable is crimped on said nose portion of said female member.

11. The thru-arm robotic welding torch system of claim 9, including a power pin received in said receiver of said male member, and a wire feeder connectable to said power pin, wherein adjustment of a disposition of said male member relative to said female member varies the relative length of said power cable between said power pin and said welding torch.

\* \* \* \* \*